(12) United States Patent
Krishnaiah

(10) Patent No.: US 11,943,212 B2
(45) Date of Patent: *Mar. 26, 2024

(54) AUTHENTICATION THROUGH MULTIPLE PATHWAYS BASED ON DEVICE CAPABILITIES AND USER REQUESTS

(71) Applicant: PAYPAL, INC., San Jose, CA (US)

(72) Inventor: Akshay Sanjeevaiah Krishnaiah, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 17/487,268

(22) Filed: Sep. 28, 2021

(65) Prior Publication Data

US 2022/0014508 A1 Jan. 13, 2022

Related U.S. Application Data

(63) Continuation of application No. 16/399,923, filed on Apr. 30, 2019, now Pat. No. 11,134,070, which is a
(Continued)

(51) Int. Cl.
*H04L 9/40* (2022.01)
*G06F 21/31* (2013.01)
*H04L 67/306* (2022.01)

(52) U.S. Cl.
CPC ............ *H04L 63/08* (2013.01); *G06F 21/31* (2013.01); *H04L 63/102* (2013.01); *H04L 67/306* (2013.01)

(58) Field of Classification Search
CPC ..... H04L 63/08; H04L 63/102; H04L 67/306; G06F 21/31
See application file for complete search history.

(56) References Cited

U.S. PATENT DOCUMENTS 9,438,588 B2 * 9/2016 Yefimov ............. H04L 63/0807
9,519,761 B2 * 12/2016 Jakobsson ............... H04L 63/08
(Continued)

FOREIGN PATENT DOCUMENTS

CN        101212457 A    7/2008
WO    2012064870 A2    5/2012
(Continued)

OTHER PUBLICATIONS

Extended European Search Report for European Application No. 16804479 dated Sep. 26, 2018, 11 pages.
(Continued)

*Primary Examiner* — Oleg Korsak
(74) *Attorney, Agent, or Firm* — Haynes and Boone, LLP

(57) ABSTRACT

There are provided systems and methods for authentication through multiple pathways depending on device capabilities and user requests. A user may wish to utilize some device process, such as unlocking and accessing the device to utilize the device's operating system or access and use of a device application or other module (e.g., a camera). The device may be protected by an authentication profile that includes one or more authentication pathways in order to authenticate the user to use those processes. The device may collect user data using device components, such as biometrics, user movements, environmental factors, or other information. The device may attempt to authenticate the user through one of the authentication pathways. If the collected user data is insufficient for one pathway, another pathway may be used. If the user is authenticated under any pathway, the device may provide access to the correspond process.

20 Claims, 10 Drawing Sheets

Related U.S. Application Data continuation of application No. 15/863,758, filed on Jan. 5, 2018, now Pat. No. 10,277,574, which is a continuation of application No. 14/729,434, filed on Jun. 3, 2015, now Pat. No. 9,866,543.

(56) References Cited

U.S. PATENT DOCUMENTS

| | | | |
|---|---|---|---|
| 9,866,543 B2* | 1/2018 | Sanjeevaiah Krishsnaiah | G06F 21/31 |
| 10,277,574 B2* | 4/2019 | Sanjeevaiah Krishnaiah | H04L 67/306 |
| 11,134,070 B2* | 9/2021 | Sanjeevaiah Krishnaiah | H04L 63/08 |
| 2006/0053296 A1 | 3/2006 | Busboom et al. | |
| 2007/0130289 A1 | 6/2007 | Defazio et al. | |
| 2011/0275348 A1 | 11/2011 | Clark et al. | |
| 2012/0303476 A1 | 11/2012 | Krzyzanowski et al. | |
| 2013/0167207 A1 | 6/2013 | Davis et al. | |
| 2014/0068266 A1 | 3/2014 | Cismas | |
| 2014/0096215 A1 | 4/2014 | Hessler | |
| 2014/0101743 A1 | 4/2014 | Busboom et al. | |
| 2015/0058960 A1 | 2/2015 | Schmoyer et al. | |
| 2015/0066762 A1 | 3/2015 | Chatterton et al. | |
| 2016/0065550 A1 | 3/2016 | Kanov et al. | |
| 2016/0087957 A1 | 3/2016 | Shah et al. | |
| 2016/0359827 A1* | 12/2016 | Krishnaiah | H04L 63/102 |

FOREIGN PATENT DOCUMENTS

| | | |
|---|---|---|
| WO | 2014176539 A1 | 10/2014 |
| WO | 2016196849 A1 | 12/2016 |

OTHER PUBLICATIONS

Extended European Search Report for European Application No. 20190753.2 dated Oct. 16, 2020, 9 pages.

International Search Report and Written Opinion for International Application No. PCT/US2016/035599 dated Sep. 2, 2016, 6 pages.

Rice T., "Samsung and Paypal Select NOK NOK LABSTO Power the First FIDO Readyauthentication Ecosystem, Secure Consumer Payments Uniquely Enabled with Easy-to-Use Fingerprint Sensors on New Samsung Galaxy S5," NOK NOK Labs, Apr. 22, 2014, 3 pages.

* cited by examiner

More to it than trust

While we can output data based on analysis within an entity:

| Key | Trusted IP | Trusted Pattern | Trusted PIN | Trusted Biometric | Trusted Email | Trusted UUID | Trusted Geo | Trusted ... |
|---|---|---|---|---|---|---|---|---|
| User1 | IP1, IP2... | P1, P2... | PIN1, PIN2 | | | | | |
| User2 | | | | B1, B2 | | | | |

We can also do second-level aggregations on different assets across entities:

| Key | # of devices | % of users with same device | Ave. usage time per user | % of fraud cases | Users' location | ... |
|---|---|---|---|---|---|---|
| IP1 | | | | | | |
| IP2 | | | | | | |

FIG. 6B

AUTHENTICATION THROUGH MULTIPLE PATHWAYS BASED ON DEVICE CAPABILITIES AND USER REQUESTS

CROSS REFERENCE TO RELATED APPLICATIONS

This application is a continuation of U.S. patent application Ser. No. 16/399,923, filed Apr. 30, 2019, which is a continuation of U.S. patent application Ser. No. 15/863,758, filed Jan. 5, 2018, which is a continuation of U.S. patent application Ser. No. 14/729,434, filed Jun. 3, 2015, all of which are incorporated herein by reference in its entirety.

TECHNICAL FIELD

The present application generally relates to utilizing a device's hardware capabilities to detect user data and authorize processes of the device and more specifically to authentication through multiple pathways based on device capabilities and user requests.

BACKGROUND

A user may utilize a device, such as a mobile phone, tablet computer, or other type of computing device. During use of the device, the user may provide or utilize sensitive information or applications/processes that expose the user to potential fraud. Moreover, the user may wish to protect the device and/or processes of the device in order to conceal and protect sensitive information and prevent unauthorized access and use of the device. In order to do so, the user may set authentication methods for processes of the device (e.g., access to the device and applications or processes executed by the device). Such authentication methods may include requirements of a PIN and/or biometric to access the processes and may include multifactor authentication. However, these authentication methods require knowledge of the authentication password or setting the user's biometric with the device. Thus, if the user wishes to allow other users to use certain processes with the device, but does not wish to allow the user to use all processes, the user may be required to either compromise their device or be present to allow access and monitor the other user's use of the device. Additionally, these authentication methods therefore require additional time to enter during each use of a process and cause extra friction during device use. Moreover, the authentication methods may simply require entered information instead of using all the device capabilities to make a correct decision in who is using the device and the proper security level to provide such a user.

BRIEF DESCRIPTION OF THE DRAWINGS

FIGS. 6A-6E are exemplary authentication profiles built from user data collected from device components, according to an embodiment.

Figure 1:
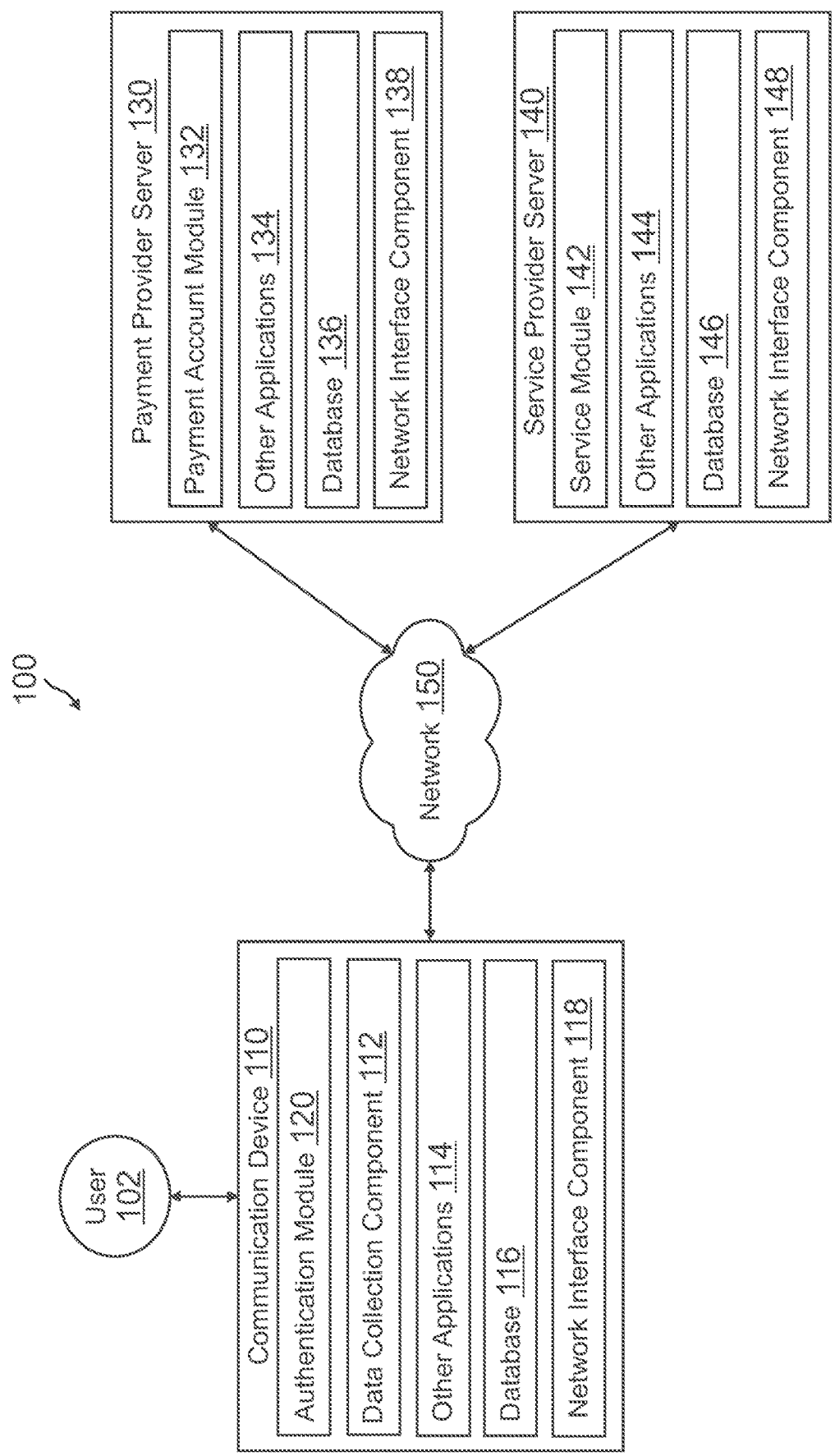
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for authentication through multiple pathways based on device capabilities and user requests. Systems suitable for practicing methods of the present disclosure are also provided.

A device may include one or more device authentication profiles that limit use of associated processes for the communication device and require matching user data to authenticate the user for each of the authentication profiles and allow access to the processes corresponding to each of the authentication profiles. In this regard, authentication profiles may be made for processes of the communication device. Processes of the communication device may include access to the device and/or the device's operating system, as well as features and capabilities of the device and/or device operating system. Thus, the processes of the device may allow for unlocking the device and operating the device. The processes may also include use of device hardware and/or software, such as a messaging and communication module (e.g., network interface), a camera, device applications (e.g., messaging and/or payment applications), and other types of executable processes by the hardware and/or software of the communication device. In other embodiments, the device processes may also correspond to connected devices with the communication device, such as remote sensors, databases or other storage resources, etc.

One or more users of the communication device may wish to protect the processes of the communication device from unauthorized use. Thus, the user(s) may utilize an authentication module, which may establish the authentication profile(s) that prevent access and use of one or more processes associated with that authentication profile unless user data collected during current use of the communication device satisfies the requirements of the authentication profile. The authentication module may therefore create an authentication profile for one or more processes, such as unlocking the communication device or utilizing an application of the communication device. The authentication profile may also be specific to certain processes within the application, for example, by allowing access and use of some features of the application but preventing or limiting use of other features. The authentication profiles may allow access and/or prevent access for one user or a group of users. In this regard, an exemplary authentication profile may be associated with a payment module of the communication device and limit use of the payment module to certain users as well as place limits on an amount of payment/transfer using the payment module.

The authentication module may be requested to establish authentication profiles for certain process by a user (e.g., owner, operator, and/or administrator) of the communication device. Thus, the user may specify the process(es) that require authentication to use. The user may also establish the required user data to be met in order to allow authenticate a user and allow access to the specified process(es). For example, the user may set the parameters for the user data that are required to be met to utilize the process. However, in other embodiments, the authentication profile may determine what user data is required to match the authentication profile and allow access to the device process(es). In such embodiments, the authentication module may determine user data for a user when the user utilizes the communication device. The authentication module may the associate this user data with a specific user. Thus, when the user data is replicated in the future, the authentication module may identify the user and authenticate that user for the processes for authentication profiles matching that user data. Moreover, each authentication profile having required user data to match the authentication profile and unlock the associated process(es) may have multiple pathways for authentication by requiring different user data in order to verify an identity of the user wishes to access those associated process(es) when using the communication device.

In order to establish authentication profiles, the authentication module may profile the communication device to determine what device components are available to collect and determine user data. In this regard, the authentication module may review the communication device system and determine what device components are available to the authentication module. The device components may correspond to one or more of a network interface module, a communication module connected to an external device or external sensor, a keypad, a mouse, a touchscreen interface, a camera, a microphone, an accelerometer, a motion detector, an environmental detector (e.g., barometer, altimeter, GPS sensor, etc.), and/or a biometric sensor. Thus, user data determined by the device component(s) may include data about use of the device by the user (e.g., applications accessed/used, emails sent, messages sent, etc.), input actions by the user (e.g., typing, scrolling, mouse actions, touchscreen movements, etc.), motions of the user while using the device (e.g., hand the user holds the device in, angle of holding the device, whether the user utilizes the device while walking or moving, etc.), information about the user (e.g., height of the user, facial recognition and/or imaging, biometric readings, clothing of the user, etc.), and/or real-world/environmental conditions for an environment that the device is used within (e.g., location, temperature, humidity, time of day, light levels, noise, etc.). An authentication profile may therefore require user data collected and/or determined by a device component to match one of these set parameters for required user data for the authentication profile in order to unlock and/or allow access to process(es) associated with that authentication profile. Moreover, the authentication profile may further require a password to be added to the authentication profile with the required user data to meet that profile.

After setting the required user data to be met for an authentication profile, during use of the communication device, the authentication module may actively and/or passively collect and determine user data during use of the communication device by a user. Based on the user data determined during the current session of use of the communication device, the authentication module may perform matching of that user data to authentication profiles to determine whether the user data (and therefore, the user utilizing the device) matches any of the authentication profiles. Based on the matching authentication profile(s), the authentication module may automatically (e.g., without user input) authenticate the user for the device process(es) associated with the matching authentication profile(s) and allow access to those process(es). The user may therefore seamlessly use such processes that the user is authorized to use based on their user data and the matching authentication profile(s). However, the user may be prevented from using device process(es) where the user has the incorrect or insufficient user data to meet the requirements of the associated authentication profile. If the user attempts to use such process(es), the user may be informed that their authentication is lacking. In various embodiments, the user may be further informed of how to satisfy the requirements of the authentication profile, such as what other user input to provide to meet the authentication profile (e.g., required to enter in a biometric reading).

Moreover, the authentication module may establish authentication profiles for device processes without user input requesting establishment of the authentication profile to protect associated device processes. For example, the authentication module may execute in the background of the operating system of the communication device and may profile the device and the user of the device by determined components of the device available to the authentication module and collecting user data about past use of the communication module by the user. The authentication module may associate this past user data with processes used by the user concurrently with the user data (e.g., processes used when the user data was collected, active, and/or current). Thus, during future uses of the communication device and/or requests to access those processes, the authentication module may require user data to match the requirements (e.g., required user data/parameters) in the generated authentication profile in order for the user to access those processes. In this regard, the authentication module may also protect the device processes.

The authentication module may also establish each authentication module to authenticate a user using an authentication profile based on available user data according to multiple pathways in order to provide access to the associated processes. Each pathway may correspond to required user data by the pathway in the authentication profile in order to authenticate the user and may require different user data. For example, access to a payment module may require one of two different authentication pathways in an authentication profile. The first authentication pathway may require a user fingerprint biometric, a location of the user, and a time of day. However, a second authentication pathway may require a certain motion to be performed by the user, detection of the users touch inputs to a touch screen, access of certain applications by the user, and height detected of the user or of the communication device while being held by the user. Thus, based on available user data and device components able to detect the user data, the user may be authenticated for an authentication profile using more than one pathway. In various embodiments, more than two pathways may be available. Moreover, fallback mechanisms may be used in the case of device malfunctioning and/or malfunctioning of one or more device components in order to allow for the user to access processes of the device. The fallback mechanisms may correspond to general multifactor authentication.

Thus, different authentication pathways (or ways to authenticate a user) may be used to provide access to a user trying to obtain a certain authentication or to provide access to different authentication levels or access. For the former, when a first authentication pathway or first type of authentication method is unsuccessful (such as due to difficulty in entering a PIN/password, faulty sensor, etc.), a second different authentication pathway or second different type of authentication may be used, both for accessing the same level or providing the same level of authentication. If the second type of authentication fails, a third one may be used. As a result, a user device may be able to leverage different ways the device can authenticate a user to provide numerous advantages, including more flexibility for the user and more control of device access. This enables a processor or other computing device to operate more efficiently because the processor may not need to process multiple attempts to authenticate through a faulty or inefficient method, but may instead recognize this and provide one or more alternative authentication methods, which may allow less authentication attempts and thus less time processing authentication requests.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a payment provider server 130, and a service provider server 140 in communication over a network 150. User 102 may utilize communication device 110 to utilize the various features available for communication device 110. Thus, user 102 may wish to access one or more processes of communication device 100, which may be protected and require authentication to access the processes. Communication device 110 may determine user data for user 102 using device components. Such user data may also be determined from payment provider server 130 and/or service provider server 140. Using the user data, communication device 110 may determine whether the user data matches one or more required user data for authentication of processes associated with one or more authentication profiles. Communication device 110 may then authorize access to the associated processes of the matching authentication profiles. In various embodiments, one or more of the processes may be associated with payment provider server 130 and/or service provider server 140, such as a payment using a payment module of communication device 110.

Communication device 110, payment provider server 130, and service provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with payment provider server 130 and/or service provider server 140. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains an authentication module 120, a data collection component 112, other applications 114, a database 116, and a communication module 118. Authentication module 120 and other applications 114 may correspond to executable processes, procedures, and/or applications with associated hardware. In other embodiments, communication device 110 may include additional or different hardware and software as required.

Authentication module 120 may correspond to one or more processes to execute modules and associated devices of communication device 110 to establish authentication profiles to prevent unauthorized access to processes of communication device 110, access determined user data including past user data for establishment of the authentication profiles, determine whether any authentication profiles match current user data when user 102 utilizes communication device 110, and provide authorization and access to the corresponding processes for the matching authentication profiles to the user data. In this regard, authentication module 120 may correspond to specialized hardware and/or software utilized by communication device 110 to first establish authentication profiles for processes of communication device 110. Each authentication profile may be associated with at least one process of communication device 110, such as access to communication device 110 and/or an operating system of communication device 110, use of a hardware or software component of communication device 110 (e.g., an optical camera, communication module, database or memory, a phone module, an audio component, and/or associated applications and application features including messaging, payment, and/or social networking applications). The processes may also correspond to features and sub-processes of a main process, such as access and/or authorization rights within an application or associated with a hardware component, for example, messaging rights, payment and transfer limits, phone privileges, etc. When establishing the processes to be protected by one or more authentication profiles, user 102 or another owner/administrator of communication device 110 may select the processes to protect. However, in other embodiments, authentication module 120 may instead automatically select one or more processes to protect from unauthorized use with an authentication profile. Authentication module 120 may select processes to protect based on a security requirement of the process, sensitive material associated with the process (e.g., personal or financial information), requirement by the process (e.g., set with an administrative entity for the process, such as a payment provider for a payment module), available types of authentication methods on the device, or other known information about the process.

Once the process(es) are selected to protect with an authentication profile, authentication module 120 may then set parameters that may be required to authenticate a user and satisfy the authentication profile so that the user associated with such parameters may access and utilize the processes protected by the authentication profile. The parameters may correspond to required user data that must be met to authenticate a user (e.g., user 102) with the authentication profile. The required user data may be set by user 102 or the owner/administrator of communication device 110 when creating the authentication profile. For example, user 102 may require a biometric, time, and location for access to a payment application and/or for payments over $100 in the payment application. However, in other embodiments, user 102 or the owner/administrator may allow authentication module 120 to select the required user data, such as based on service provider authentication/risk models. Moreover, in embodiments where authentication module 120 automatically creates one or more authentication profiles to protect communication device 110, authentication module 120 may also set the required user data. In embodiments where authentication module 120 selects the required user data for an authentication profile, authentication module 120 may select the required user data for collected and/or determined user data at the time that an authorized user was utilizing the process. For example, authentication module 120 may detect a user height, location, user input characteristics (e.g., a way the user types, moves the mouse, utilizes a touch screen, scrolls through menus, etc.), and/or other user data when the authorized user is utilizing a payment application (e.g., not fraudulently). Authentication module 120 may require this user data for future uses of the payment application. Authentication module 120 may allow for different authentication pathways for an authentication profile to allow use of the corresponding processes. For example, if a biometric is not available for the user, authentication module 120 may allow for the time of day and location to match known user data for authorized users in order to satisfy the required user data for the authentication profile. Moreover, authentication module 120 may adapt and change required user data over time to accommodate changing conditions, such as a move to a new address, change in person's information, use of the process, etc.

Once authentication profiles are established by authentication module 120, the associated processes of communication device 110 may require corresponding authentication profiles to be established to allow access and use of those processes. Thus, unauthorized user who cannot satisfy the required user data may be prevented from accessing and utilizing such processes. In order to determine whether a user is authorized to use one or more processes, authentication module 120 may access current user data during use of communication device 110 by user 102. In this regard, user 102 may generate current user data based on user 102's use of communication device 110. Thus, user data may include biometrics, environment factors, user information, user actions, user input, etc. For example, applications used by user 102 and/or actions within the applications may be included within the user data, as well as current biometrics for user 102. A height and/or position user 102 holds or utilizes communication device 110 or a device component of communication device 110 (e.g., a mouse, keyboard, touch interface, etc.) may correspond to user data. User data may include ambient light, noise, location, pressure, humidity, and/or other environmental information. Moreover, user data may be captured by cameras, breathalyzers, scanners, or other types of sensors to determine user data (e.g., facial/body recognition).

In various embodiments, user data may also correspond to data received over network 150, for example, from payment provider server 130 and/or service provider server 140. For example, user data may correspond to social networking interactions by user 102 on service provider server 140, payments made and/or received using payment provider server 130, or other online actions over network 150 with another device or server. In various embodiments, user data may be receives from a device connected to communication device 110, for example, using short range wireless communications (e.g., a pedometer or other wearable device tracking user biometrics). Communication device 110 and the connected device may communicate over near field communication, Bluetooth, Bluetooth Low Energy, radio, infrared, LTE Direct, or other communication protocol. Once the current user data is accessed by authentication module 120, authentication module 120 may determine authorizations for user 102 based on the user data and the authentication profiles in order to allow user 102 to access one or more processes. Authentication module 120 may receive a request to utilize one or more processes during use of communication device 110, for example, from user 102 when user 102 attempts to access those processes. However, in other embodiments, authentication module 120 may constantly process current user data in order to determine authentications to allow access to processes by user 102.

Authentication module 120 may then determine if user 102 may access and use a process based on the corresponding authentication profile. As discussed herein, user 102 may be authenticated for a process based on one or more pathways within an authentication profile, providing a fallback mechanism to allow user 102 to access the process even where user data required by one pathway for authentication is unavailable or incorrect (e.g., device malfunction, different user data but authorized user, change in circumstances causing new user data, etc.). Once authenticated for an authentication profile, authentication module 120 may allow user 102 to access and use the corresponding process(es) for the authentication profile. Authentication module 120 may further continue tracking user data so that if the user data changes to no longer be compliant with an authentication profile, authentication module 120 may then lock or otherwise prevent access and use of the process(es) for the authentication profile until the required user data is again met.

Data collection component 112 may correspond to one or more processes and/or specialized hardware of communication device 110 to collect and/or determine past user data for an authorized user of an authentication profile and current user data for user 102 during user 102's use of communication device 110. In this regard, data collection component 112 may correspond to specialized hardware and/or software that may collect and/or determine user data during a session of use of communication device 110 by utilizing one or more device components for communication device 110. Data collection component 112 may correspond to one or more of a network interface module, a communication module connected to an external device or external sensor, a keypad, a mouse, a touchscreen interface, a camera, a microphone, an accelerometer, a motion detector, an environmental detector (e.g., barometer, altimeter, GPS sensor, etc.), and/or a biometric sensor. Thus, user data determined by data collection component 112 may include data about use of communication device 110 by user 102 (e.g., applications accessed/used, emails sent, messages sent, etc.), input actions by user 102 (e.g., typing, scrolling, mouse actions, touchscreen movements, etc.), motions of user 102 while using communication device 110 (e.g., hand user 102 holds communication device 110 in, angle of holding communication device 110, whether user 102 utilizes communication device 110 while walking or moving, etc.), information about user 102 (e.g., height of user 102, facial recognition and/or imaging, biometric readings, clothing of user 102, etc.), and/or real-world/environmental conditions for an environment that communication device 110 is used within (e.g., location, temperature, humidity, time of day, light levels, noise, etc.). Data collection module 112 may store the determined user data to database 116 for use with authentication profiles.

Authentication module 120 may further determine a device profile for communication device 110 based on the capabilities of data collection component 112, for example, what user data can be collected and/or determined using data collection component 112. The device profile may be used to determine an authentication pathway for an authentication profile. Thus, based on capabilities of data collection component 112 and the user data determined by data collection component 112, authentication module 120 may determine authentication profiles and a device profile for available authentication mechanisms through required user data determined by data collection component 112 for that authentication mechanism.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking, online payments, money transfer, or other applications associated with a payment provider, such as a payment application, which may be limited in use by authentication profiles requiring authentication through user data for use of various processes. As previously discussed, other applications may include social networking applications and/or merchant applications. Other applications 114 may include device interfaces and other display modules that may receive input from user 102 and/or output information to user 102. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with authentication module 120 and/or other applications 114, identifiers associated with hardware of communication device 110, or other appropriate identifiers, such as identifiers used for payment/user/device authentication or identification. Database 116 may include authentication profiles as well as authentication profile data, such as associated processes protected by the authentication profile and require user data to perform authentication for the profiles. Additionally, user data collected by data collection component 112 may be stored to database 116 for use with the authentication profiles.

Communication device 110 includes at least one communication module 118 adapted to communicate with payment provider server 130 and/or service provider server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Payment provider server 130 may be maintained, for example, by an online payment service provider, which may provide payment services and/or processing for financial transactions on behalf of users. In this regard, payment provider server 130 includes one or more processing applications which may be configured to interact with communication device 110, service provider server 140, and/or another device/server to facilitate payment for a transaction. In one example, payment provider server 130 may be provided by PAYPAL®, Inc. of San Jose, CA, USA. However, in other embodiments, payment provider server 130 may be maintained by or include a credit provider, financial services provider, financial data provider, and/or other service provider, which may provide payment services to user 102.

Payment provider server 130 of FIG. 1 includes payment account module 132, other applications 144, a database 146, and a network interface component 138. Payment account module 132 and other applications 144 may correspond to executable processes, procedures, and/or applications with associated hardware. In other embodiments, payment provider server 130 may include additional or different modules having specialized hardware and/or software as required.

Payment account module 132 may correspond to one or more processes to execute modules and associated specialized hardware of payment provider server 130 to receive and/or transmit information from communication device 110 for establishment of payment accounts and processing and completion of one or more transactions initiated by user 102 using the payment accounts. In this regard, payment account module 132 may correspond to specialized hardware and/or software to establish payment accounts, which may be utilized to send and receive payments and monetary transfers and engage in other financial transactions. User 102 may establish a payment account with payment account module 132 by providing personal and/or financial information to payment provider server 130 and selecting an account login, password, and other security information. The payment account may be accessed through a browser application and/or dedicated payment application executed by communication device 110. Thus, communication device 110 may protect and limit use of the payment account or other payment services offered by payment provider server 130 using authentication profiles, as discussed herein.

Payment module 132 may further process a received transaction from communication device 110 by receiving the transaction from communication device 110 with a payment request for a payment for the transaction. The payment request may correspond to a payment token, including a payment instrument and identification of the transaction, and may be encrypted prior to transmission to payment account module 132 to prevent unauthorized receipt of a payment instrument. The payment token may include information corresponding to user identifiers, user financial information/ identifiers, transaction information and/or other identifiers. Additionally, the payment token may include a payment amount and terms of payment for the transaction. Once received, payment account module 132 may utilize a payment account or financial information (e.g., a payment instrument such as a credit/debit card, bank account, etc.) of user 102 to render payment for the transaction. Payment account module 132 may receive purchase authorizations, in certain embodiments, and process payments for transaction in accordance with the purchase authorizations. Payment may be made to a merchant device or another user device using the payment instrument and the terms of the payment request. Additionally, payment account module 132 may provide transaction histories, including receipts, to communication device 110.

In various embodiments, payment provider server 130 includes other applications 134 as may be desired in particular embodiments to provide features to payment provider server 134. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to user 102 when accessing payment provider server 134. In various embodiments where not provided by payment account module 132, other applications 134 may include connection and/or communication applications, which may be utilized to communicate information to over network 150.

Additionally, payment provider server 130 includes database 146. As previously discussed, user 102 and/or the merchant corresponding to merchant location 130/merchant server 140 may establish one or more payment accounts with payment provider server 130. Payment accounts in database 146 may include user/merchant information, such as name, address, birthdate, payment/funding information, additional user financial information, and/or other desired user data. User 102 and/or the merchant may link to their respective payment accounts through a user, merchant, and/ or device identifier. Thus, when an identifier is transmitted to payment provider server 130, e.g. from communication device 110, merchant devices 132, and/or merchant server 140, a payment account belonging to user 102 and/or the merchant may be found. Payment amounts may be deducted from one payment account and paid to another payment account. In other embodiments, user 102 and/or the merchant may not have previously established a payment account and may provide other financial information to payment provider server 130 to complete financial transactions, as previously discussed.

In various embodiments, payment provider server 130 includes at least one network interface component 138 adapted to communicate communication device 110, merchant devices 132, and/or merchant server 140 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Service provider server 140 may be maintained, for example, by a service provider entity, which may provide services to user 102, which may provide data and/or information to communication device 110 for determining user data and authorizing user 102 with communication device 110. In this regard, service provider server 140 includes one or more processing applications which may be configured to interact with communication device 110 and/or payment provider server 130 over network 150 to provide information to communication device 110. In one example, service provider server 140 may be provided by EBAY®, Inc. of San Jose, CA, USA and/or STUBHUB®, Inc, of San Francisco, CA, USA. However, in other embodiments, service provider server 140 may be maintained by or include another type of service provider, such as a social networking, messaging, location services, travel, biometric analysis, and/or other type of service provider.

Service provider server 140 of FIG. 1 includes a service module 142, other applications 144, a database 146, and a communication module 148. Service module 142 and other applications 144 may correspond to executable processes, procedures, and/or applications with associated hardware. In other embodiments, service provider server 140 may include additional or different modules having specialized hardware and/or software as required.

Service module 142 may correspond to one or more processes to execute modules and associated specialized hardware of service provider server 140 to provide a service to user 102, which may generate data and/or information used to determine user data for user 102, and provide such information to communication device 110. In this regard, service module 142 may correspond to specialized hardware and/or software to host and/or provide a service to user 102, which may include or be associated with calendaring, social networking, messaging, mapping and travel routing, location, biometrics, shopping, and/or other types of services. Thus, service module 142 may host a website offering the aforementioned services or provide such services through a dedicated application available for use with a communication device (e.g., an email server accessible through a website/application, a social networking server, etc.). Service module 142 may facilitate the generation of data/ information used to determine user data for user 102 by generating the data/information related to actions by user 102 using the service. The information may include exchanged messages, shopping actions, locations, etc. Service module 142 may also provide actions and/or interactions by user 102 using services. A map, location, and/or travel route by user 102 may be used to determine a location for user 102. Service module 142 may also provide biometrics used to determine user data. For example, biometrics may be used to determine when user 102 is exercising, when user 102 sleeps, a user's heart rate, a user's fingerprint or facial recognition information, etc. Service module 142 may also provide shopping information, which may be used to determine a user's common actions.

In various embodiments, service provider server 140 includes other applications 144 as may be desired in particular embodiments to provide features to service provider server 140. For example, other applications 144 may include security applications for implementing server-side security features, programmatic client applications for interfacing with appropriate application programming interfaces (APIs) over network 150, or other types of applications. Other applications 144 may contain software programs, executable by a processor, including a graphical user interface (GUI), configured to provide an interface to user 102 when accessing service provider server 140. In various embodiments where not provided by service module 142, other applications 144 may include connection and/or communication applications, which may be utilized to communicate information to over network 150.

Additionally, service provider server 140 includes database 146. Database 146 may be utilized to store information utilized by one or more modules and/or applications of service provider server 140, including service module 142 and/or other applications 144. In this regard, database 146 may include received and/or determined information, including identifiers and other identification information. Information and data generated using service provider server 140 by user 102 and for use in determining user data for user 102.

In various embodiments, service provider server 140 includes at least one communication module 148 adapted to communicate communication device 110 and/or payment provider server 130 over network 150. In various embodiments, communication module 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
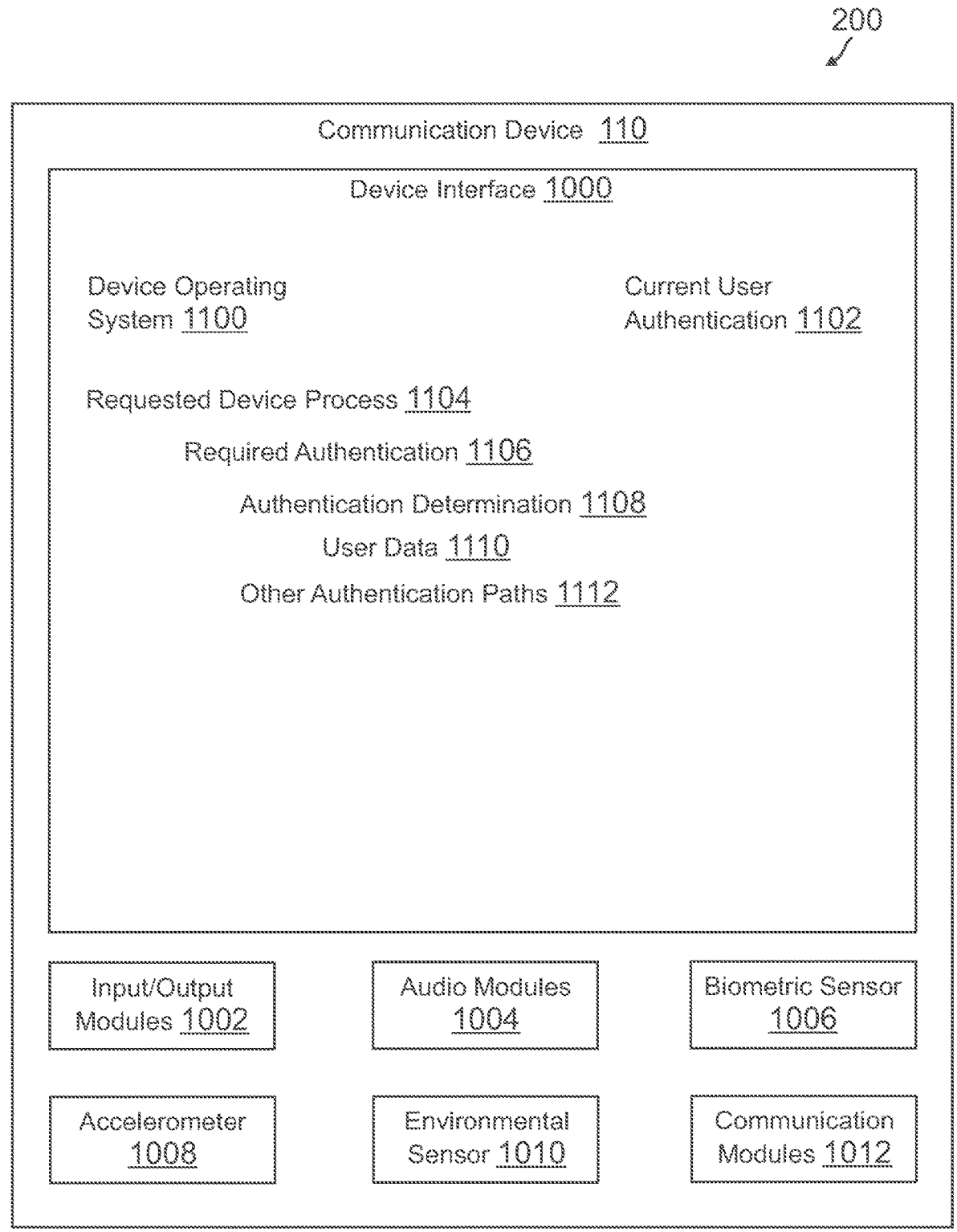
FIG. 2 is an exemplary device having device components for determining user data and a user interface displaying protected device processes requiring the user data to match one or more authentication profiles for use, according to an embodiment.

FIG. 2 is an exemplary device having device components for determining user data and a user interface displaying protected device processes requiring the user data to match one or more authentication profiles for use, according to an embodiment. Environment 200 includes communication device 110 from environment 100 of FIG. 1 executing module and processes discussed in reference to environment 100. Thus, communication device 110 includes a device interface 1000 that may be used to display one or more processes that may be protected by one or more authentication profiles from unauthorized use.

Device interface 1000 may correspond to a display interface where user 102 may view processes executed by communication device 110 and interact with such processes through user input. Thus, device interface 1000 may include a device operating system 1100, which may require a current user authentication 1102 for use of various processes of device operating system 1100 by a user while the user utilizes communication device 110. For example, device operating system 1100 may execute a requested device process 1104 but require current user authentication to match a required authentication 1106 for requested device process 1104. In this regard, communication device 110 may make an authentication determination 1108 using user data 1110, which may be used to determine current user authentication 1102, which may include an authorization to user requested device process 1104. Moreover, based on user data 1110, other authentication paths 1112 may be selected based on the capabilities of communication device 110 and/or available data in user data 1110.

In order to collect user data 1110, communication device 110 may utilize one or more device components to collect and/or determine user data 1110. Thus, communication device 110 may include input/output modules 1102, such as a mouse, keyboard, touchscreen interface, etc., which may collect input from a user utilizing communication device 110 and output information to the user. Moreover, communication device 110 may include audio modules, such as a microphone and speaker, which may detect a user's voice, voice input, and/or environmental noise. Additionally, communication device 110 may detect user data through a biometric sensor 1006 and/or accelerometer 1008, including fingerprints, facial recognition information, heartbeat, motions, height, etc. Communication device 110 may detect ambient light levels, atmospheric pressure, humidity, etc., through environmental sensor 1010. Communication module 110 may also receive user data over a network connection or through short range wireless communications with a nearby device using communication module 1012. In various embodiments, communication device 110 may include further or different sensors and device components.

Figure 3:
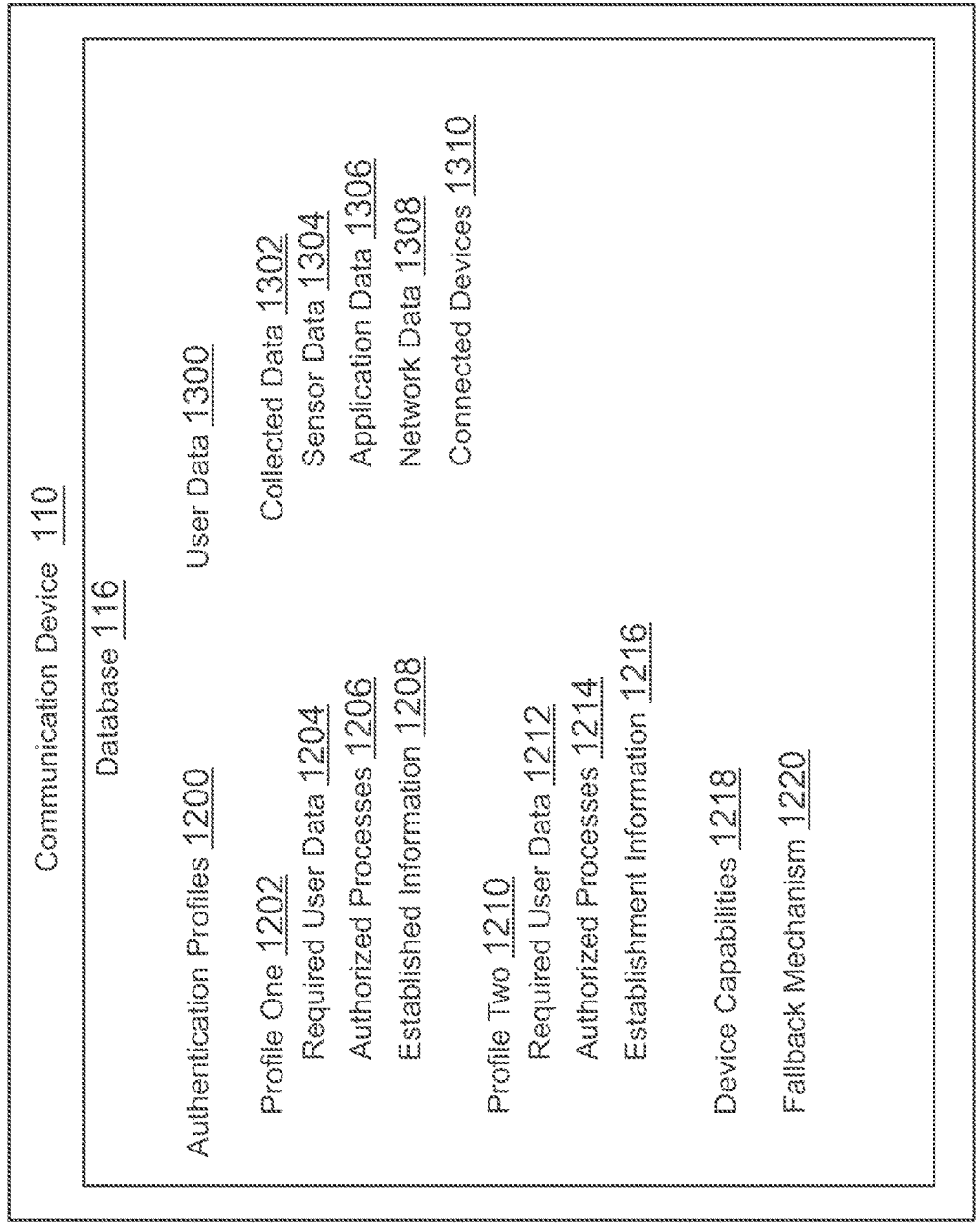
FIG. 3 is an exemplary device database storing authentication profiles for device processes and determined user data during use of the device by a user, according to an embodiment.

FIG. 3 is an exemplary device database storing authentication profiles for device processes and determined user data during use of the device by a user, according to an embodiment. Environment 300 of FIG. 3 includes communication device 110 from environment 100 of FIG. 1 executing module and processes discussed in reference to environment 100.

Communication device 310 executes a check-in module 320 corresponding generally to the specialized hardware and/or software modules and processes described in reference to authentication module 120 of FIG. 1. In this regard, database 116 stores information discussed in reference to environment 100 of FIG. 1, such as authentication profiles 1200 and user data 1300.

Authentication profiles 1200 includes a profile one 1202, a profile two 1210, device capabilities 1218, and fallback mechanism 1200. Profile one 1202 may correspond to an authentication profile that may allow access and use of one or more processes when user data matches the requirements of profile one 1202. Thus, profile one 1202 includes required user data 1204, which may include user data required to be authenticated under profile one 1202. When user data 1300 matches required user data 1204, communication device 110 may allow access to authorized processes 1206. In various embodiments, required user data 1204 may include more than one authentication pathways, each requiring different user data for authentication under profile one 1202. Profile one 1202 may also include establishment information 1208 generated during establishment of profile one 1202, which may be used to update profile one 1202 when required user data 1204 changes based on changed circumstances. Similarly, profile two 1210 also includes required user data 1212, authorized processes 1214, and establishment information 1216. An authorization module may also profile communication device to determine device capabilities 1218, which may correspond to available device components used to determine user data and authorize a user under profile one 1202 and/or profile two 1210. Moreover, a fallback mechanism 1220 may be used to authorize a user in the event that one or more device components are faulty.

Database 116 also stores user data 1300 determined by device components of communication device 110. User data 1300 may include collected data 1302, which may also be required to be processed and determined in user data 1300 (e.g., detection of a motion used to determine a height of a user). Collected data 1302 includes sensor data 1304 collected from device sensor components (e.g., a biometric sensor, camera, etc.). Collected data 1302 may also include application data 1306 determined from applications executed by communication device 110 and network data 1308 received over a network connection by communication device 110. In various embodiments, collected data 1302 may also include data received from connected device 1310.

Figure 4:
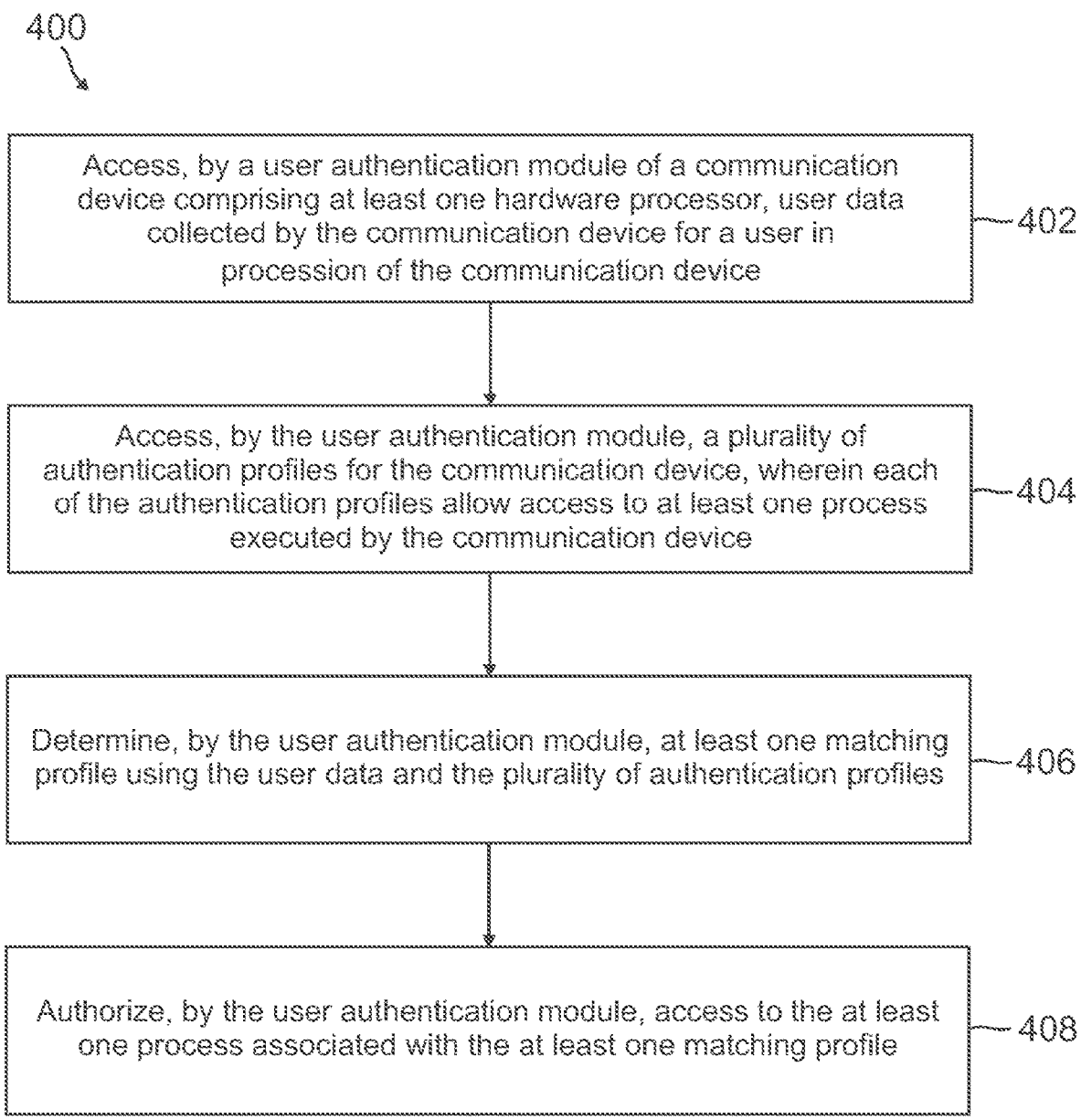
FIG. 4 is a flowchart of an exemplary process for authentication through multiple pathways depending on device capabilities and user requests, according to an embodiment.

FIG. 4 is a flowchart of an exemplary process for authentication through multiple pathways depending on device capabilities and user requests, according to an embodiment. Note that one or more steps, processes, and methods described herein may be omitted, performed in a different sequence, or combined as desired or appropriate.

At step 402, user data collected by the communication device for a user in possession of the communication device is accessed, by a user authentication module of a communication device comprising at least one hardware processor. The user data may be collected by a device component, such as one or more of a network interface module, a communication module connected to an external device or external sensor, a keypad, a mouse, a touchscreen interface, a camera, a microphone, an accelerometer, a motion detector, an environmental detector, and a biometric sensor. The communication device may further determine the user data using a communication device application. For example, the device application may comprise one of a messaging application, a social networking application, a payment application, a shopping application, an email application, a media sharing or editing application, and an imaging application associated with a camera device corresponding to the communication device.

At step 404, a plurality of authentication profiles for the communication device is accessed, by the user authentication module, wherein each of the authentication profiles allows access to at least one process executed by the communication device. The authentication profiles may be determined based on user actions. The user actions may comprise past actions by the user when using the communication device during at least one past use of the communication device by the user. The communication device may collect or determine the past actions during use of the at least one process associated with the at least one matching profile. The user actions may comprise at least one of use of the communication device, input actions with the communication device, motions while using the communication device, and real-world conditions of an environment for the communication device during the use of the communication device.

In various embodiments, each of the authentication profiles may be different for at least one of a type of the at least one process associated with the each of the authentication profiles and a use of the at least one process associated with the each of the authentication profiles by the user. The use of the at least one process may be determined based on the user's request within the at least one process. The at least one process may comprise access to utilize the communication device or the communication device's operating system. In other embodiments, the at least one process may correspond to an application executed by the communication device. The application may comprise a payment application of the communication device utilizing a payment provider.

At least one matching profile using the user data and the plurality of authentication profiles is determined, by the user authentication module, at step 406. The at least one process associated with the at least one matching profile may correspond to a payment application executed by the communication device. Use of the payment application may be limited by the at least one matching profile. In various embodiments, the user may determine the authentication profiles based on requirements for device and application security. Thus, at step 408, access to at least one process associated with the at least one matching profile is authorized, by the user authentication module. Moreover, a change in the user data may be received, and the authorization may further determine if the change in the user data is compliant with the at least one process associated with the at least one matching profile and currently authorized by the user authentication module. Additionally, the authorization module may further determine whether the change further matches additional profiles in the authentication profiles. If so, access to at least one process associated with the additional profiles nay be authorized.

Figure 5:
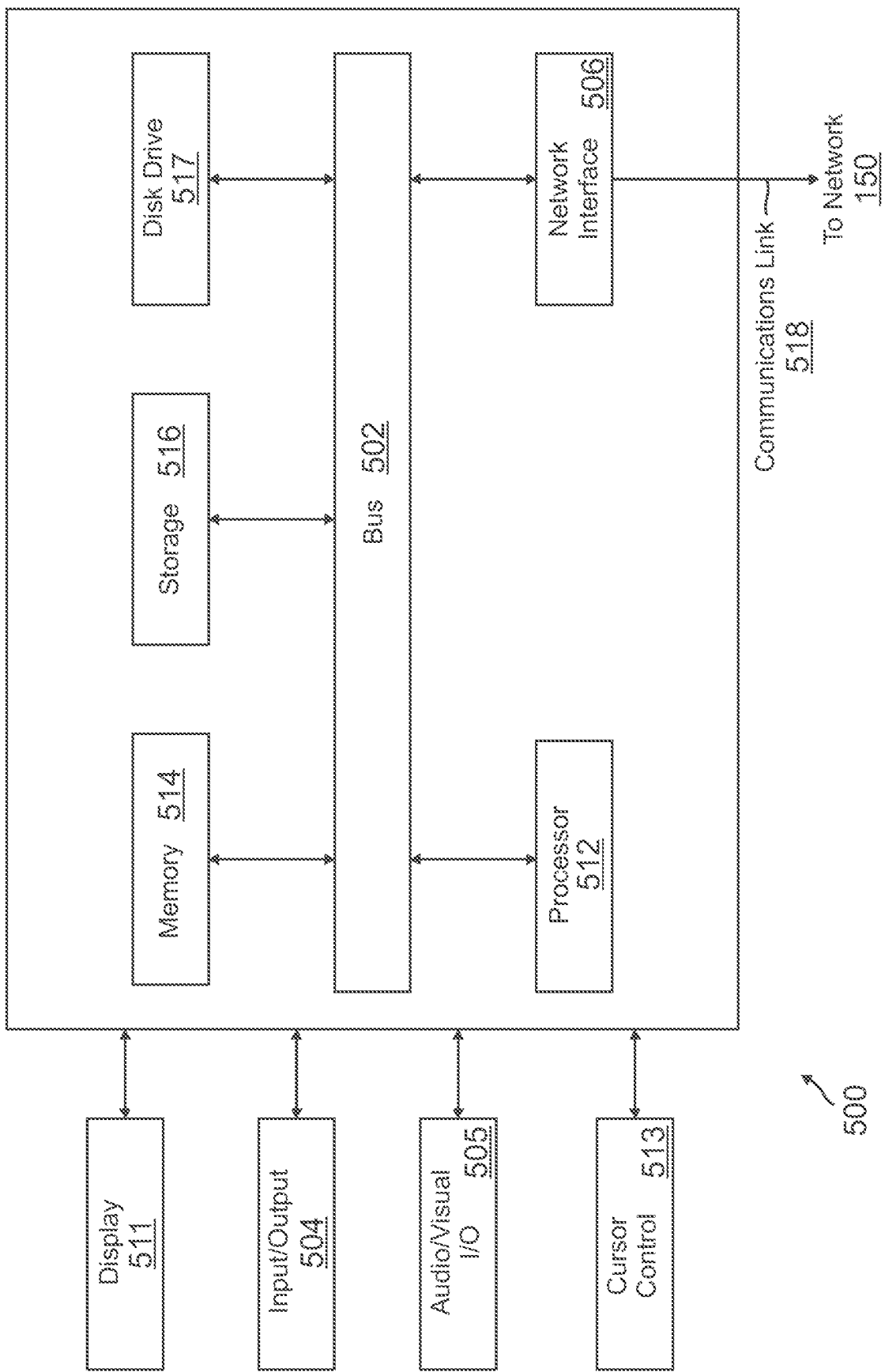
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 6A:
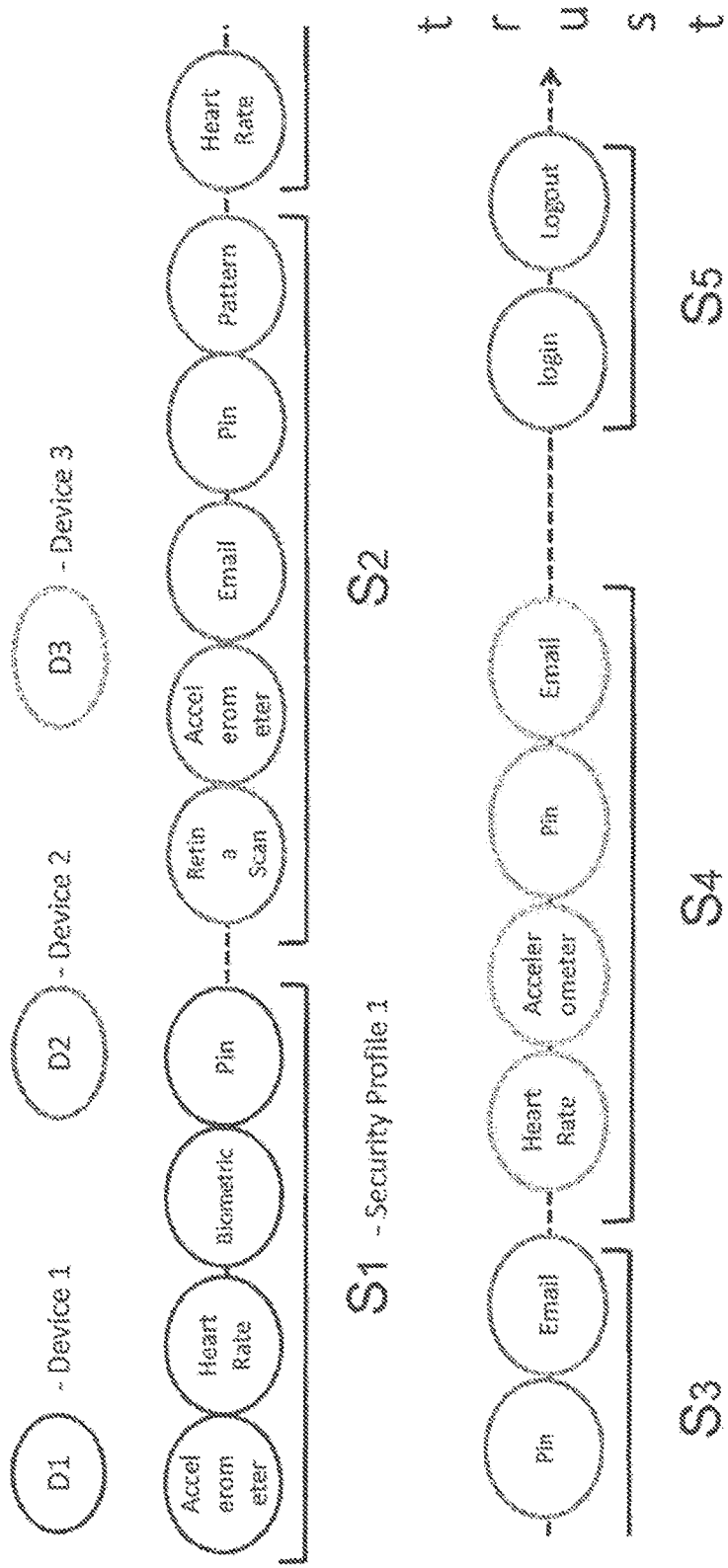
Figure 6C:
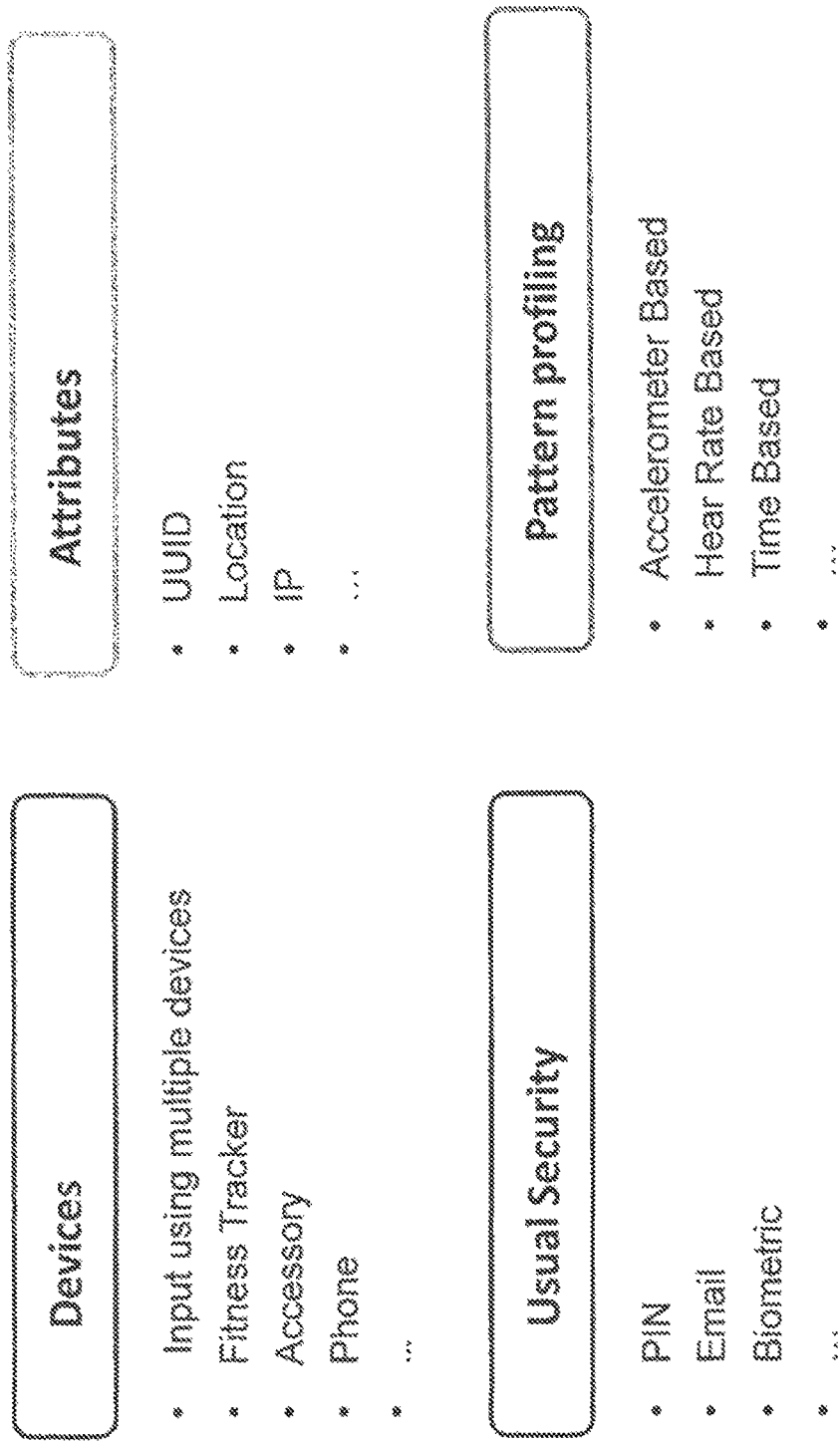
Figure 6D:
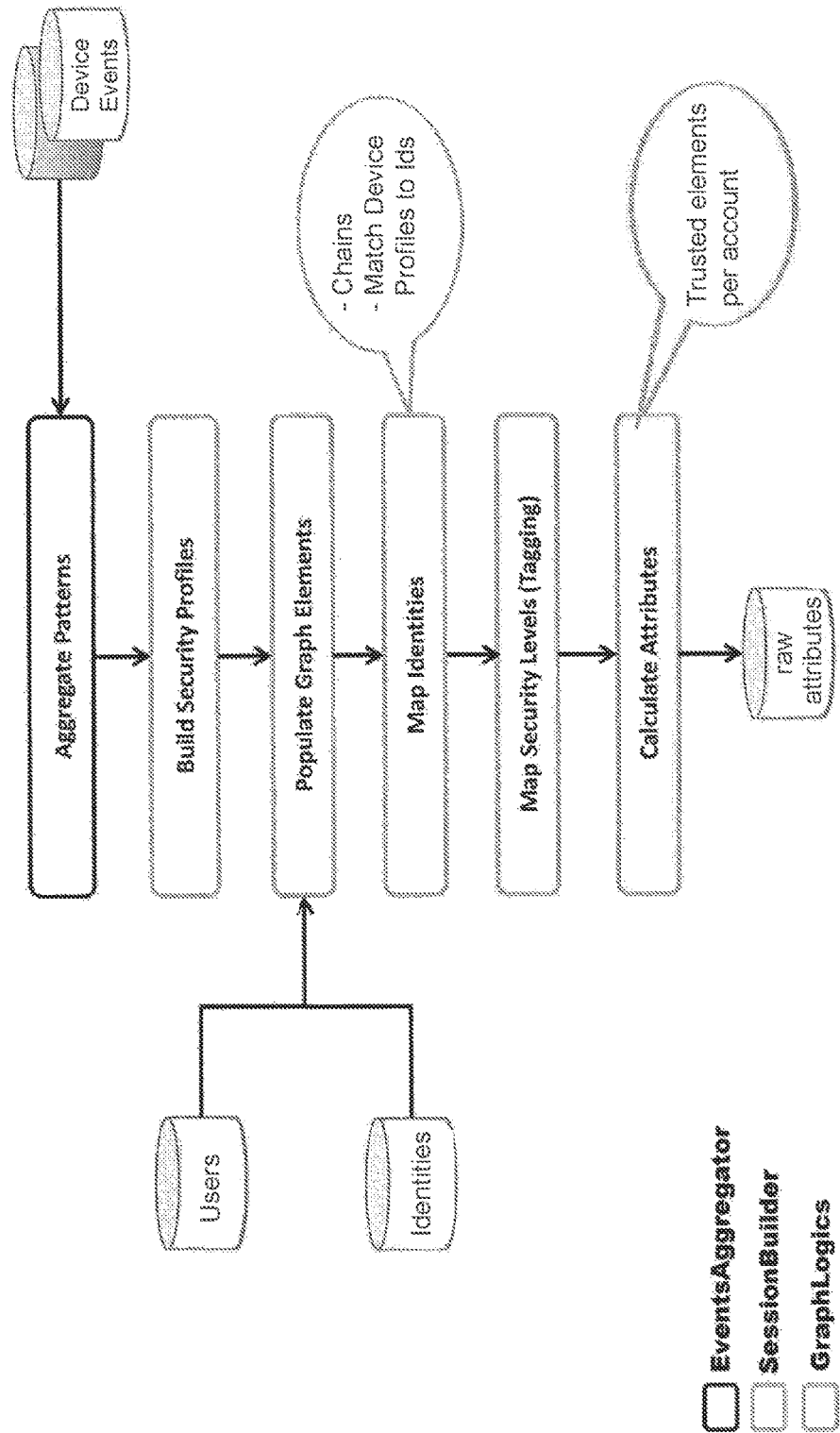
Figure 6E:
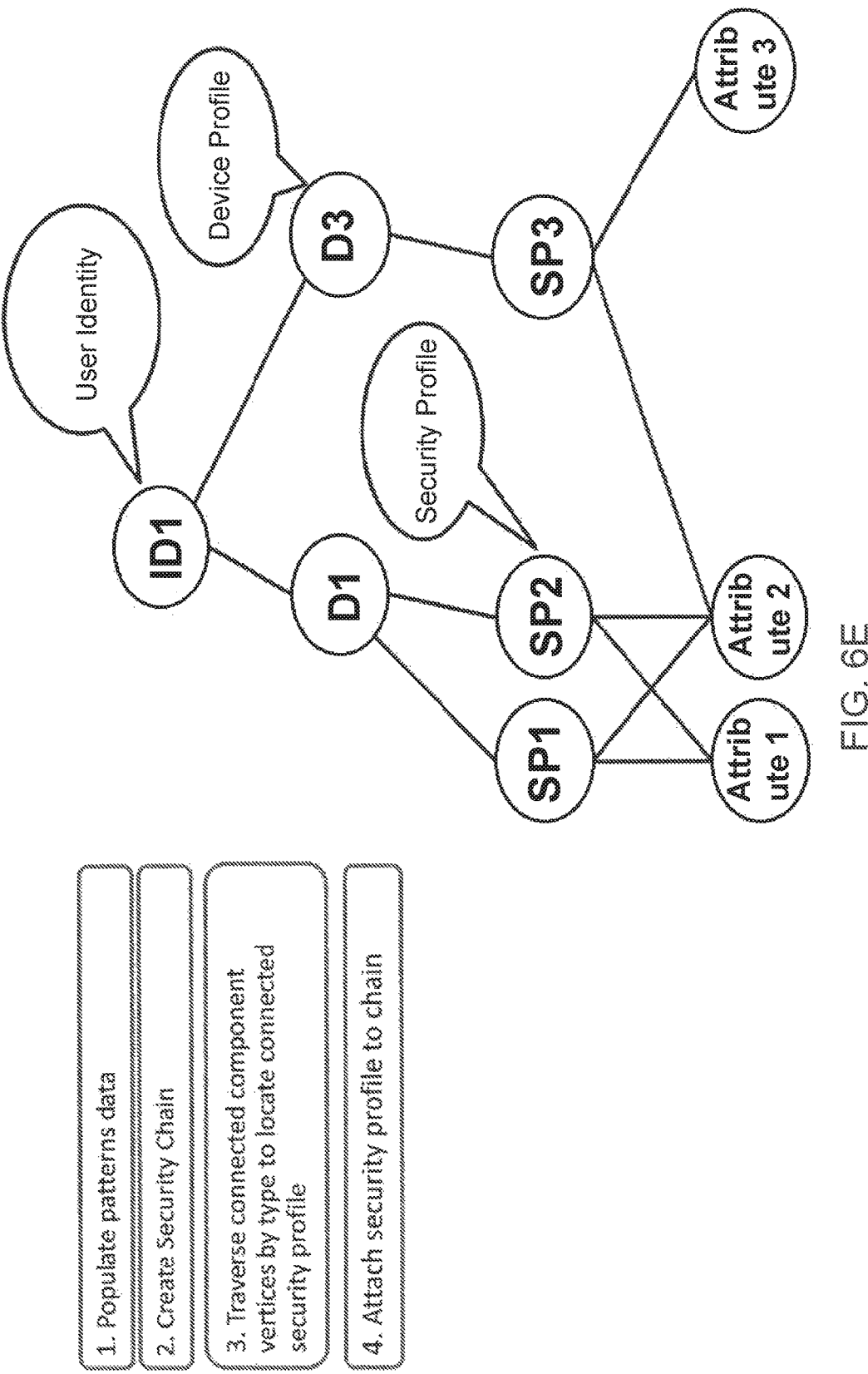

FIGS. 6A-6E are exemplary authentication profiles built from user data collected from device components, according to an embodiment. For example, FIG. 6A shows a plurality of authentication profiles having various required user data for authentication. In FIG. 6B, data may be output based on analysis of the data, for example, to recognize an entity. FIG. 6C shows multiple available types of user data, which may be used to build an authentication profile for a device. In FIG. 6D, an exemplary flowchart shows how to determine a device authentication profile. Moreover, in FIG. 6E, authentication profile chains may be built for authenticating users across various devices based available attributes and authentication profiles (security profiles).

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
generating a plurality of authentication pathways for an authentication profile for a communication device of a user based on user data detectable by a communication device of a user via a plurality of device components for the communication device;
determining, for each of the plurality of authentication pathways, a set of the plurality of device components necessary to carry out an authentication;
receiving an authentication request via the communication device;
determining, at a time of the authentication request, a set of usable components from the plurality of device components for the authentication request, wherein the set of usable components comprise a subset of the plurality of device components that are usable for detecting the user data at the time of the authentication request;
identifying, based on iterating through the set of usable components from the plurality of device components for a detection of the user data at the time of the authentication request, one or more available authentication pathways from the plurality of pathways available to be used for the authentication request; and
selecting an optimal authentication pathway from the one or more available authentication pathways.

2. The system of claim 1, wherein the operations further comprise:
obtaining additional user data based on inputs from the plurality of device components; and
updating the plurality of authentication pathways for the authentication profile based on the additional user data.

3. The system of claim 1, wherein the plurality of device components on which user data is detectable include two or more of a network interface module, a communication module connected to an external device or an external sensor, a keypad, a mouse, a touchscreen interface, a camera, a microphone, an accelerometer, a motion detector, an environmental detector, or a biometric sensor.

4. The system of claim 1, wherein the operations further comprise:
detecting that one or more of the plurality of device components has become unavailable; and updating, based on the detecting, the one or more available authentication pathways from the plurality of pathways available to be used for the authentication request.

5. The system of claim 1, wherein the authentication profile provides access to at least one process executed on the communication device.

6. The system of claim 1, wherein the authentication profile is determined based on past interactions by the user with the plurality of device components.

7. The system of claim 1, wherein the authentication profile corresponds to interactions by a single user with the plurality of device components.

8. The system of claim 1, wherein the generating the plurality of authentication pathways for the authentication profile is further based on user data detectable by the communication device via a plurality of applications executable on the communication device.

9. The system of claim 8, wherein the plurality of applications from which user data is detectable include two or more of a messaging application, a social networking application, a payment application, a shopping application, an email application, a media sharing or editing application, or an imaging application associated with a camera device on the communication device.

10. A method comprising:
generating a plurality of authentication pathways for an authentication profile for a communication device of a user based on user data detectable by a communication device of a user via a plurality of device components for the communication device;
receiving an authentication request via the communication device;
determining, at a time of the authentication request, a set of usable components from the plurality of device components for the authentication request, wherein the set of usable components comprise a subset of the plurality of device components that are usable for detecting the user data at the time of the authentication request;
identifying, based on iterating through the set of usable components from the plurality of device components for a detection of the user data at the time of the authentication request, one or more available authentication pathways from the plurality of pathways available to be used for the authentication request, the one or more available authentication pathways being selectable based on a predetermined metric.

11. The method of claim 10, further comprising:
selecting an optimal authentication pathway from the one or more available authentication pathways based on the predetermined metric.

12. The method of claim 10, further comprising:
obtaining additional user data based on inputs from the plurality of device components; and
updating the plurality of authentication pathways for the authentication profile based on the additional user data.

13. The method of claim 10, wherein the plurality of device components on which user data is detectable include two or more of a network interface module, a communication module connected to an external device or an external sensor, a keypad, a mouse, a touchscreen interface, a camera, a microphone, an accelerometer, a motion detector, an environmental detector, or a biometric sensor.

14. The method of claim 11, wherein generating the plurality of authentication pathways for the authentication profile is further based on user data detectable by the communication device via a plurality of applications executable on the communication device.

15. The method of claim 14, wherein the plurality of applications from which user data is detectable include two or more of a messaging application, a social networking application, a payment application, a shopping application, an email application, a media sharing or editing application, or an imaging application associated with a camera device on the communication device.

16. The method of claim 10, wherein the authentication profile provides access to at least one process executed on the communication device, and wherein the authentication profile is determined based on past interactions by the user with the plurality of device components.

17. The method of claim 10, wherein the authentication profile corresponds to interactions by a single user with the plurality of device components.

18. A non-transitory machine-readable medium having stored thereon machine-readable instructions executable to cause a machine to perform operations comprising:
generating a plurality of authentication pathways for an authentication profile for a communication device of a user based on user data detectable by a communication device of a user via a plurality of device components for the communication device;
determining, for each of the plurality of authentication pathways, a set of the plurality of device components necessary to carry out an authentication;
receiving an authentication request via the communication device;
determining, at a time of the authentication request, a set of usable components from the plurality of device components for the authentication request, wherein the set of usable components comprise a subset of the plurality of device components that are usable for detecting the user data at the time of the authentication request;
identifying, based on iterating through the set of usable components from the plurality of device components for a detection of the user data at the time of the authentication request, one or more available authentication pathways from the plurality of pathways available to be used for the authentication request; and
selecting an authentication pathway from the one or more available authentication pathways based on a predetermined metric.

19. The non-transitory machine-readable medium of claim 18, wherein the operations further comprise:
obtaining additional user data based on inputs from the plurality of device components; and
updating the plurality of authentication pathways for the authentication profile based on the additional user data.

20. The non-transitory machine-readable medium of claim 18, wherein the plurality of device components on which user data is detectable include two or more of a network interface module, a communication module connected to an external device or an external sensor, a keypad, a mouse, a touchscreen interface, a camera, a microphone, an accelerometer, a motion detector, an environmental detector, or a biometric sensor.

* * * * *